United States Patent
Amick et al.

(10) Patent No.: US 7,091,275 B1
(45) Date of Patent: Aug. 15, 2006

(54) AQUEOUS POLYMERIC COMPOSITION CONTAINING POLYMERIC NANOPARTICLES AND TREATMENTS PREPARED THEREFROM

(75) Inventors: David Richard Amick, Doylestown, PA (US); Wayne Devonport, Doylestown, PA (US); Antony Keith Van Dyk, Blue Bell, PA (US); Catherine Ann Finegan, Warrington, PA (US); Joseph Michael Hoefler, Bensalem, PA (US); Dennis Paul Lorah, Lansdale, PA (US); Alvin Michael Maurice, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 28 days.

(21) Appl. No.: 10/461,954

(22) Filed: Jun. 13, 2003

Related U.S. Application Data

(60) Provisional application No. 60/414,589, filed on Sep. 30, 2002, provisional application No. 60/389,043, filed on Jun. 14, 2002.

(51) Int. Cl.
C08L 33/00 (2006.01)
C08L 33/02 (2006.01)

(52) U.S. Cl. ............... 524/522; 524/556; 524/560; 524/525; 524/502; 524/515

(58) Field of Classification Search ............... 524/556, 524/560, 525, 502, 515, 522
See application file for complete search history.

(56) References Cited

U.S. PATENT DOCUMENTS

| | | | |
|---|---|---|---|
| 4,560,714 A * | 12/1985 | Gajria et al. ............... | 523/409 |
| 5,212,273 A | 5/1993 | Das et al. | |
| 5,536,628 A * | 7/1996 | Wang et al. ............... | 430/531 |
| 5,539,073 A | 7/1996 | Taylor et al. ............... | 526/323 |
| 5,712,339 A * | 1/1998 | Guerin et al. ............... | 524/515 |
| 5,863,996 A | 1/1999 | Graham | |
| 5,910,359 A * | 6/1999 | Kobayashi et al. ....... | 428/32.15 |
| 6,028,155 A | 2/2000 | Collins et al. ............... | 526/270 |
| 6,130,014 A * | 10/2000 | Yau et al. .................. | 430/14 |
| 6,268,222 B1 | 7/2001 | Chandler et al. | |
| 6,329,446 B1 | 12/2001 | Sacripante et al. | |
| 6,646,041 B1 * | 11/2003 | St. John Williams et al. .................. | 524/522 |
| 2002/0065208 A1 | 5/2002 | Aubay et al. | |
| 2003/0059599 A1* | 3/2003 | Beckley et al. ............. | 428/327 |
| 2003/0232914 A1* | 12/2003 | Devonport et al. ......... | 524/501 |
| 2003/0232918 A1 | 12/2003 | Amick et al. | |

FOREIGN PATENT DOCUMENTS

| | | |
|---|---|---|
| EP | 1 245 587 A1 | 10/2002 |
| WO | WO 93/00376 | 1/1993 |
| WO | WO 93/24534 | 12/1993 |
| WO | WO 9324534 A1 * | 12/1993 |
| WO | WO 99/01522 | 1/1999 |
| WO | WO 00/59951 | 10/2000 |
| WO | WO 01/43859 | 6/2001 |
| WO | WO 01/90226 | 11/2001 |
| WO | WO 200226895 A1 * | 4/2002 |

OTHER PUBLICATIONS

Copending U.S. Appl. Nos. 10/461,952; 10/461,949; 10/461,958.*
U.S. Appl. No. 10/461,956, filed Jun. 13, 2003, Ghosh et al.
U.S. Appl. No. 10/461,958, filed Jun. 13, 2003, Bowe.
U.S. Appl. No. 10/461,964, filed Jun. 13, 2003, Lauer et al.
U.S. Appl. No. 10/461,963, filed Jun. 13, 2003, Even et al.
U.S. Appl. No. 10/461,959, filed Jun. 13, 2003, Lauer et al.
U.S. Appl. No. 10/461,949, filed Jun. 13, 2003, Lofton et al.
U.S. Appl. No. 10/461,954, filed Jun. 13, 2003, Amick et al.
U.S. Appl. No. 10/461,955, filed Jun. 13, 2003, Kauffman et al.
U.S. Appl. No. 10/461,952, filed Jun. 13, 2003, Devonport et al.
U.S. Appl. No. 10/462,111, filed Jun. 13, 2003, Cruz.
U.S. Appl. No. 10/461,948, filed Jun. 13, 2003, Lorah.
U.S. Appl. No. 10/462,110, filed Jun. 13, 2003, Devonport et al.
U.S. Appl. No. 10/461,965, filed Jun. 13, 2003, Lester et al.
U.S. Appl. No. 10/461,971, filed Jun. 13, 2003, Daly et al.
U.S. Appl. No. 10/461,953, filed Jun. 13, 2003, Lorah et al.
U.S. Appl. No. 10/097,256, filed Mar. 15, 2002, Beckley et al.
U.S. Appl. No. 10/452,175, filed Jun. 2, 2003, Amick et al.
Dieter Horn and Jens Rieger, "Organic Nanoparticles in the Aqueous Phase—Theory, Experiment, and Use", Agnew, Chem. Int. Ed. 2001, 40, pp. 4330-4361.

* cited by examiner

*Primary Examiner*—David W. Wu
*Assistant Examiner*—Satya B. Sastri
(74) *Attorney, Agent, or Firm*—Kim R. Jessum; Gary D. Greenblatt

(57) ABSTRACT

An aqueous polymeric composition containing select polymeric nanoparticles is provided. The select polymeric nanoparticles contain as polymerized units at least one multiethylenically unsaturated monomer and at least one water soluble monomer; and have a mean diameter in the range of from 1 to 50 nanometers. Also provided are aqueous polymeric compositions that further contain second particles such as pigment particles or second polymer particles. The aqueous polymeric composition is useful for preparing coatings having at least one improved property compared to a coating absent the select polymeric nanoparticles. Further, the aqueous polymeric composition is useful for treating wood. A coating prepared from the aqueous polymeric composition is also provided.

3 Claims, No Drawings

AQUEOUS POLYMERIC COMPOSITION CONTAINING POLYMERIC NANOPARTICLES AND TREATMENTS PREPARED THEREFROM

CROSS REFERENCE TO RELATED PATENT APPLICATIONS

This is a non-provisional application of prior pending U.S. provisional applications Ser. No. 60/389,043 filed on Jun. 14, 2002 and 60/414,589 filed Sep. 30, 2002.

The present invention relates to an aqueous polymeric composition containing select polymeric nanoparticles. The present invention also relates to aqueous polymeric compositions containing a blend of select polymeric nanoparticles and second particles, such as polymer particles or pigment particles. The aqueous polymeric composition is useful for preparing coatings with improved properties such as block resistance, print resistance, and dirt pickup resistance. The aqueous polymeric composition is also useful in providing compositions that have a low volatile organic content. The present invention also relates to methods for using the aqueous polymeric composition to prepare coatings and penetrative treatments.

As used herein, "coatings" is used to refer to compositions that are commonly identified as architectural coatings, such as, for example, flat coatings, semigloss coatings, gloss coatings, primers, topcoats, stain-blocking coatings, elastomeric coatings, mastics, caulks, and sealants, as well as industrial coatings, such as, for example, board and paneling coatings, transportation coatings, furniture coatings, and coil coatings; maintenance coatings such as, for example, bridge and tank coatings, and road marking paints; inks; varnishes; leather coatings and treatments; floor care coatings; paper coatings; personal care coatings such as for hair, skin, and nails; and coatings for woven and nonwoven fabrics, all of which are applied to a variety of substrates. Such coatings are characterized by the formation of a substantially continuous film on the surface of the substrate to which they are applied, when in the dry state.

As used herein, "penetrative treatments" is used to refer to substances which, when applied to certain substrates of a porous nature, such as, for example, wood, penetrate into the pores of the substrate rather than form a substantially continuous film on the surface of the substrate.

Unless specifically indicated to the contrary, as used herein, the term "treatments" is used to generally and broadly refer to both coatings and penetrative treatments, as respectively defined above.

There has long been and there is an ongoing need in the art for aqueous polymeric compositions for preparing coatings having certain desired properties in the dry state after application to a substrate, that reflect an improvement in at least one purpose for which the coating is applied, such as, for example, improving the block resistance, print resistance, mar resistance, scrub resistance, burnish resistance, dirt pickup resistance, adhesion, gloss, flexibility, toughness, impact resistance, water resistance, heat seal resistance, chemical resistance, and stain resistance of the coated substrate. There has also been and there is an ongoing need in the art for aqueous polymeric compositions for preparing penetrative treatments for protecting certain substrate materials of a porous nature, such as wood, and other natural and engineered cellulosic based substrates.

The present invention is based on our discovery that the incorporation of certain select polymeric nanoparticles into aqueous based treatments greatly improves the properties of both coatings and penetrative treatments.

Published PCT Patent Application WO 99/01522 discloses a composition including a crosslinking agent and polymeric particles having a mean particle diameter that is most preferably between about 20 and about 40 nanometers, formed in the presence of the reaction product of one or more carboxylic fatty acids and ammonia or one or more polyfunctional aromatic or aliphatic amines, with the dried composition providing a water resistant wood. The compositions prepared according to the above are described both as coatings and as being penetrative, although specific improvements to any of the coating properties mentioned above are not disclosed therein. Moreover, certain compositions according to this reference have the disadvantage of involving the use of ammonia in their preparation, which causes certain environmental and health and safety concerns.

Accordingly, it is still desired to provide aqueous based coating and penetrative treatment compositions which demonstrate at least one improved property as described above, and which do not involve the use of ammonia. It has now been found that such improvements are provided by aqueous based treatments that include an aqueous dispersion of polymeric particles having a mean diameter of from 1 to 50 nanometers, the particles including, as polymerized units, at least one multiethylenically unsaturated monomer and at least one water soluble monomer.

Improvements in the aforementioned coating and penetrative treatment properties are obtained in treatments according to the present prepared from aqueous polymeric compositions including select polymeric nanoparticles (PNPs). The select PNPs have a mean diameter of from 1 to 50 nanometers (nm) and contain, as polymerized units, at least one multiethylenically unsaturated monomer and at least one water soluble monomer.

According to a first aspect of the present invention, an aqueous polymeric composition includes PNPs dispersed in an aqueous medium, the PNPs having, as polymerized units, at least one multiethylenically unsaturated monomer and at least one water soluble monomer, wherein the PNPs have a mean diameter in the range of from 1 to 50 nm; and second particles, dispersed in the aqueous medium, the second particles being selected from second polymer particles, pigment particles, and mixtures thereof.

A second aspect of the present invention relates to a method for providing an aqueous polymeric coating composition containing PNPs, the PNPs having, as polymerized units, at least one multiethylenically unsaturated monomer and at least one water soluble monomer, and wherein the PNPs have a mean diameter in the range of from 1 to 50 nm, the method including the steps of: applying the coating onto a substrate and drying or allowing to dry the aqueous polymeric PNP-containing composition to provide a dried coating on the substrate.

A third aspect of the present invention provides a coating containing PNPs having a mean diameter in the range of from 1 to 50 nm, the PNPs having, as polymerized units, at least one multiethylenically unsaturated monomer and at least one water soluble monomer.

A fourth aspect of the present invention provides a penetrative treatment composition and method for treating a porous substrate, such as wood, the method including the steps of applying onto the porous substrate an aqueous polymeric composition containing PNPs, the PNPs having, as polymerized units, at least one multiethylenically unsaturated monomer and at least one water soluble monomer, and wherein the PNPs have a mean diameter in the range of from 1 to 50 nm; allowing the aqueous polymeric composition to penetrate into the porous substrate; and drying or allowing to dry the aqueous polymeric composition applied to the porous substrate to provide a treated porous substrate.

The aqueous polymeric composition of the present invention includes an aqueous dispersion of polymeric particles having a mean diameter in the range of from 1 to 50 nm, the particles including, as polymerized units, at least one multiethylenically unsaturated monomer and at least one ethylenically unsaturated water soluble monomer. As used herein, the term "dispersion" refers to a physical state of matter that includes at least two distinct phases, wherein a first phase is distributed in a second phase, with the second phase being a continuous medium. The term "aqueous" is used herein to refer to a medium that is from 50 to 100 weight % water, based on the weight of the aqueous medium.

The PNPs of the present invention are addition polymers which contain, as polymerized units, at least one multiethylenically unsaturated monomer and at least one ethylenically unsaturated water soluble monomer. Suitable multiethylenically unsaturated monomers useful in the present invention include di-, tri-, tetra-, and higher multifunctional ethylenically unsaturated monomers, such as, for example, divinyl benzene, trivinylbenzene, divinyltoluene, divinylpyridine, divinylnaphthalene divinylxylene, ethyleneglycol di(meth)acrylate, trimethylolpropane tri(meth)acrylate, diethyleneglycol divinyl ether, trivinylcyclohexane, allyl (meth)acrylate, diethyleneglycol di(meth)acrylate, propyleneglycol di(meth)acrylate, 2,2-dimethylpropane-1,3-di (meth)acrylate, 1,3-butylene glycol di(meth)acrylate, 1,4-butanediol di(meth)acrylate, 1,6-hexanediol di(meth) acrylate, tripropylene glycol di(meth)acrylate, triethylene glycol di(meth)acrylate, tetraethylene glycol di(meth)acrylate, polyethylene glycol di(meth)acrylates, such as polyethylene glycol 200 di(meth)acrylate and polyethylene glycol 600 di(meth)acrylate, ethoxylated bisphenol A di(meth) acrylate, poly(butanediol) di(meth)acrylate, pentaerythritol tri(meth)acrylate, trimethylolpropane triethoxy tri(meth) acrylate, glyceryl propoxy tri(meth)acrylate, pentaerythritol tetra(meth)acrylate, dipentaerythritol monohydroxypenta (meth)acrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly (vinyl hydro siloxane), poly(phenyl vinyl siloxane), and mixtures thereof. As used herein, the term "(meth)acrylic" includes both acrylic and methacrylic and the term "(meth) acrylate" includes both acrylate and methacrylate. Likewise, the term "(meth)acrylamide" refers to both acrylamide and methacrylamide. "Alkyl" includes straight chain, branched and cyclic alkyl groups.

Typically, the PNPs contain at least 1% by weight, based on the weight of the PNPs, of at least one polymerized multiethylenically unsaturated monomer. Up to and including 99.5 weight % polymerized multiethylenically unsaturated monomer, based on the weight of the PNPs, is effectively used in the particles of the present invention. It is preferred that the amount of polymerized multiethylenically unsaturated monomer is from 1% to 80%, more preferably from 1% to 60%, and most preferably from 1% to 25%, by weight, based on the weight of the PNPs.

The PNPs further contain, as polymerized units, at least one water soluble monomer. By "water soluble monomer" herein is meant a monomer having a solubility in water of at least 7 weight %, preferably at least 9 weight %, and most preferably at least 12 weight %, at a temperature of 25° C. Data for the water solubility of monomers is found, for example, in "Polymer Handbook" (Second Edition, J. Brandrup, E. H. Immergut, Editors, John Wiley & Sons, New York) and "Merck Index"(Eleventh Edition, Merck & Co, Inc., Rahway, N.J.). Examples of water soluble monomers include ethylenically unsaturated ionic monomers and ethylenically unsaturated water soluble nonionic monomers. Typically, the amount of the polymerized water soluble monomer is at least 0.5 weight %, based on the weight of the PNPs. Up to and including 99 weight % polymerized water soluble monomer, based on the weight of the PNPs, is effectively used in the particles of the present invention.

Ethylenically unsaturated ionic monomer, referred to herein as "ionic monomer", is a monomer that is capable of bearing an ionic charge in the aqueous medium in which the PNPs are dispersed. Suitable ionic monomers include, for example, acid-containing monomers, base-containing monomers, amphoteric monomers; quaternized nitrogen-containing monomers, and other monomers that are subsequently formed into ionic monomers, such as monomers which are neutralized by an acid-base reaction to form an ionic monomer. Suitable acid groups include carboxylic acid groups and strong acid groups, such as phosphorus containing acids and sulfur containing acids. Suitable base groups include amines. It is preferred that the amount of polymerized ionic monomer based on the weight of the PNPs is in the range from 0.5 to 99 weight %, more preferably in the range of from 1 to 50 weight %, even more preferably from 2 to 40 weight %, and most preferably from 3 to 25 weight %.

Suitable carboxylic acid-containing monomers include carboxylic acid monomers, such as (meth)acrylic acid, acryloxypropionic acid, and crotonic acid; dicarboxylic acid monomers, such as itaconic acid, maleic acid, fumaric acid, and citraconic acid; and monomers which are half esters of dicarboxylic acids, such as monomers containing one carboxylic acid functionality and one $C_{1-6}$ ester. Preferred are acrylic acid and methacrylic acid. Suitable strong acid monomers include sulfur acid monomers, such as 2-acrylamido-2-methyl propane sulfonic acid, styrene sulfonic acid, vinyl sulfonic acid, sulfoethyl(meth)acrylate, sulfopropyl (meth)acrylate, 2-acrylamido-2-methyl propane sulfinic acid, styrene sulfinic acid, and vinyl sulfinic acid; and phosphorus acid monomers, such as 2-phosphoethyl(meth) acrylate, vinyl phosphoric acid, and vinyl phosphinic acid. Other acid monomers include terminally unsaturated acid containing macromonomers, such as are disclosed in U.S. Pat. No. 5,710,227. Phosphorus acid monomers are desirable as they provide improved adhesion to certain substrates (e.g., metal).

Suitable base-containing monomers include monomers having amine functionality, which includes N,N-dimethylaminoethyl(meth)acrylate, N,N-diethylaminoethyl (meth) acrylate, N-t-butylaminoethyl(meth)acrylate, N,N-dimethylaminopropyl (meth)acrylamide, p-aminostyrene, N,N-cyclohexylallylamine, allylamine, diallylamine, dimethylallylamine, N-ethyldimethylallylamine, crotyl amines, and N-ethylmethallylamine; monomers having pyridine functionality, which includes 2-vinylpyridine and 4-vinylpyridine; monomers having piperidine functionality, such as vinylpiperidines; and monomers having imidazole functionality, which includes vinyl imidazole. Other suitable base-containing monomers include oxazolidinylethyl(meth) acrylate, vinylbenzylamines, vinylphenylamines, substituted diallylamines, 2-morpholinoethyl(meth)acrylate, methacrylamidopropyl trimethyl ammonium chloride, diallyl dimethyl ammonium chloride, 2-trimethyl ammonium ethyl methacrylic chloride, and the like.

Suitable amphoteric monomers include N-vinylimidazolium sulfonate inner salts and N,N-Dimethyl-N-(3-methacrylamidopropyl)-N-(3-sulfopropyl) ammonium betaine.

Suitable functional monomers, in which the functionality is subsequently formed into an acid or base include monomers containing: an epoxide functionality, such as glycidyl (meth)acrylate and allyl glycidyl ether; an anhydride, such as maleic anhydride; an ester such as methyl acrylate; and a halide. Suitable halide-containing functional monomers include vinylaromatic halides and halo-alkyl(meth)acrylates. Suitable vinylaromatic halides include vinylbenzyl chloride and vinylbenzyl bromide. Other suitable functional monomers include allyl chloride, allyl bromide, and (meth) acrylic acid chloride. Suitable halo-alkyl(meth)acrylates include chloromethyl(meth)acrylate. Suitable functional monomers, in which the functionality is subsequently forming into a nonionic water soluble group include vinyl acetate. Hydrolysis of the polymerized vinyl acetate provides hydroxyl groups to the PNPs.

Multiethylenically unsaturated monomers that are also water soluble monomers are alternatively used to prepare the PNPs. In such embodiments, these monomers are classified for the purposes of the present invention as both a multiethylenically unsaturated monomer and a water soluble monomer. An example of a water soluble, multiethylenically unsaturated monomer is phosphodi(ethyl methacrylate).

Ethylenically unsaturated water soluble nonionic monomers are referred to herein as "water soluble nonionic monomers". Examples of water soluble nonionic monomers include hydroxyalkyl(meth)acrylates, such as hydroxyethyl (meth)acrylate and hydroxypropyl(meth)acrylate; poly (alkylene oxide)esters of (meth)acrylic acid, such as poly (ethylene oxide)$_{20}$ methacrylate and poly(propylene oxide)$_{150}$ acrylate; acrylamide; and methacrylamide. It is preferred that the amount of polymerized water soluble nonionic monomer based on the weight of the PNPs is in the range from 0.5 to 99 weight %, more preferably in the range of from 20 to 90 weight %, even more preferably from 30 to 80 weight %, and most preferably from 40 to 70 weight %. When the PNPs include, as polymerized units, ionic monomer and nonionic water soluble monomer, lower levels of polymerized nonionic water soluble monomer are preferred.

The PNPs optionally contain, as polymerized units, one or more third monomers that are not multiethylenically unsaturated monomers and are not water soluble monomers. Suitable third monomers include $C_1$–$C_{24}$ alkyl (meth)acrylates, such as methyl(meth)acrylate, ethyl(meth)acrylate, propyl (meth)acrylate, butyl(meth)acrylate, isobutyl(meth) acrylate, hexyl (meth)acrylate, cyclohexyl(meth)acrylate, 2-ethylhexyl(meth)acrylate, octyl (meth)acrylate, decyl (meth)acrylate, dodecyl(meth)acrylate, pentadecyl (meth) acrylate, hexadecyl(meth)acrylate, octadecyl(meth)acrylate, and nonadecyl(meth)acrylate, and mixtures thereof. Other suitable third monomers include vinyl acetate; vinyl versatate; diisobutylene; ureido containing monomers such as N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, and benzyl N-(ethyleneureido-ethyl) maleamate; vinylaromatic monomers, such as styrene, α-methylstyrene, vinyltoluene, p-methylstyrene, ethylvinylbenzene, vinylnaphthalene, vinylxylenes, and nonylphenoxy propenyl polyethoxylated alcohol. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$)alkyl, ($C_1$–$C_{10}$)alkoxy, carboxy, and the like.

The PNPs have a mean diameter in the range of from 1 to 50 nm, preferably in the range of from 1 to 40 nm, more preferably from 1 to 30 nm, even more preferably from 1 to 25 nm, even further preferably from 1 to 20 nm, and most preferably from 1 to 10 nm. It is further typical that the PNPs have a mean particle diameter of at least 1.5 nm, preferably at least 2 nm. One method of determining the particle sizes (mean particle diameter) of the PNPs is by using standard dynamic light scattering techniques, wherein the correlation functions are converted to hydrodynamic sizes using LaPlace inversion methods, such as CONTIN.

Typically, PNPs including, as polymerized units, less than 10 weight % multiethylenically unsaturated monomer, have a glass transition temperature from –90° C. to 170° C. for the composition in the absence of the polymerized multiethylenically unsaturated monomer, as determined by a modulated differential scanning calorimetry (DSC) measurement. PNPs containing, as polymerized units, at least 50 weight % multiethylenically unsaturated monomer are considered to have glass transition temperatures of at least 50° C.

The PNPs of the present invention typically have an "apparent weight average molecular weight" in the range of from 5,000 to 1,000,000, preferably in the range of from 10,000 to 500,000, and more preferably in the range of from 15,000 to 100,000. As used herein, "apparent weight average molecular weight" reflects the size of the PNP particles using standard gel permeation chromatography methods, e.g., using THF solvent at 40° C., 3 Plgel™ Columns (Polymer Labs, Amherst, Mass.), 100 Angstrom (10 nm), $10^3$ Angstroms (100 nm), $10^4$ Angstroms (1 micron), 30 cm long, 7.8 mm ID, 1 milliliter per minute, 100 microliter injection volume, calibrated to narrow polystyrene standards using Polymer Labs CALIBRE™ software.

The PNPs are further characterizable as having suitable hydrophilicities that allow the PNPs to be dispersed into an aqueous medium. One method to characterize the hydrophilicity of the PNPs is to calculate the Hansch parameter, which is actually a measure of hydrophobicity. The Hansch parameter is calculated using a group contribution method. The monomer units forming the polymer are assigned a hydrophobicity contribution and the relative hydrophobicity of the polymer is calculated based on the weight average of the monomers in the polymer. Hansch and Fujita, *J. Amer. Chem. Soc.,* 86, 1616–1626 (1964); H. Kubinyi, *Methods and Principles of Medicinal Chemistry,* Volume 1, R. Mannhold et al., Eds., VCH, Weinheim (1993); C. Hansch and A. Leo, *Substituent Constants for Correlation Analysis in Chemistry and Biology,* Wiley, New York (1979); and C. Hansch, P. Maloney, T. Fujita, and R. Muir, *Nature,* 194.178–180 (1962).

Values of the hydrophobicity contributions for several monomers are listed in Table 1.

TABLE 1

| Monomer | Hydrophobicity Contribution |
|---|---|
| ethyl acrylate | 2.11 |
| butyl acrylate | 3.19 |
| 2-ethyl hexylacrylate | 5.22 |
| styrene | 4.29 |
| methyl methacrylate | 1.89 |
| ethyl methacrylate | 2.43 |
| butyl methacrylate | 3.51 |
| isobornyl methacrylate | 5.0 |

TABLE 1-continued

| Monomer | Hydrophobicity Contribution |
|---|---|
| butadiene | 4.0 |
| acrylic acid | −2.52 |
| methacrylic acid | −2.2 |
| maleic anhydride | −3.5 |

Preferred PNPs have a Hansch parameter in the range of from −2.5 to 4, preferably from −1 to 3.

Certain embodiments of the PNPs further contain other functional groups, which are provided by the polymerization of monomers containing those groups or precursor groups thereof. One method of attaching such other functional groups to the PNPs is by reacting the ionic group of the PNP with a suitable compound. For example, PNPs containing carboxylic acid groups are modified to contain pendant hydrophilic groups by reacting carboxylic acid groups with a suitable alcohol, such as a capped polyalkylene oxide. Alternatively, functional groups are affixed to the PNPs through non-radical reactions resulting in the formation of ionic or covalent bonds between a modifying compound containing the groups and complementary reactable groups covalently bound to the PNP, such as is taught in U.S. Pat. No. 5,270,380.

The complementary reactable groups in the PNP and modifying compound provide either ionic or covalent bonding, as appropriate for each reactable group. Complementary ionic bonding includes acid-base interaction and ion pair bonding of negatively and positively charged atoms. Covalent bonding by complementary reactable groups includes, for example: (a) acetoacetate-aldehyde; (b) acetoacetate-amine; c) amine-aldehyde; (d) amine-anhydride; (e) amine-isocyanate; (f) amine-epoxy; (g) aldehyde-hydrazide; (i) acid-epoxy; (j) acid-carbodiimide; (k) acid-chloro methyl ester; (j) acid-chloro methyl amine; (m) acid-anhydride; (n) acid-aziridine; (o) epoxy-mercaptan; and (p) isocyanate-alcohol. One of the first and second reactable groups in each pair is present either in the PNP or, alternatively, in the modifying compound.

A suitable method to prepare the aqueous polymeric composition containing the PNPs dispersed in an aqueous medium includes the steps of preparing a nonaqueous PNP dispersion containing the PNPs dispersed in at least one solvent; and combining the nonaqueous PNP dispersion with an aqueous medium. By "nonaqueous" herein is meant a medium that contains from zero to less than 50 weight % water, based on the weight of the nonaqueous medium. Aqueous polymeric compositions containing PNPs that include, as polymerized units, ionic monomers, are optionally partially or completely neutralized prior to, during, or after combining with the aqueous medium.

A suitable polymerization process to prepare the nonaqueous PNP dispersion is free radical solution polymerization of at least one multiethylenically unsaturated monomer, at least one water soluble monomer, and, in certain embodiments, at least one third monomer. As used herein, "solution polymerization" means free radical addition polymerization in a suitable solvent for the polymer. As used herein, "suitable solvent for the polymer" means that linear random (co)-polymers having substantially similar polymerized monomer units to the PNPs, are soluble in the solvent. Another method for selecting a suitable solvent or mixture of solvents is on the basis of using solubility parameter analysis. According to such methods, the suitability of the solvent is determined by substantially matching the solubility parameters of the PNP and of the solvent, such as the Van Krevelen parameters of delta d, delta p, delta h and delta v. See, for example, Van Krevelen et al., *Properties of Polymers. Their Estimation and Correlation with Chemical Structure*, Elsevier Scientific Publishing Co., 1976; Olabisi et al., *Polymer—Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, $2^{nd}$ Ed., CRC Press, 1991. Delta d is a measure of dispersive interactions, delta p is a measure of polar interactions, delta h is a measure of hydrogen bonding interactions, and delta v is a measure of both dispersive and polar interactions. Such solubility parameters are calculated by alternative methods, such as by the group contribution method, and by experimental determination, as is known in the art. A preferred solvent has a delta v parameter within 5 (joule per cubic centimeter)$^{1/2}$, preferably within 1 (joule per cubic centimeter)$^{1/2}$ of the polymer delta v parameter. Suitable solvents for the polymerization include organic solvents, such as hydrocarbons; alkanes; halohydrocarbons; chlorinated, fluorinated, and brominated hydrocarbons; aromatic hydrocarbons; ethers; ketones; esters; alcohols; and mixtures thereof. Particularly suitable solvents, depending on the composition of the PNP, include dodecane, mesitylene, xylenes, diphenyl ether, gamma-butyrolactone, ethyl acetate, ethyl lactate, propyleneglycol monomethyl ether acetate, caprolactone, 2-heptanone, methylisobutyl ketone, acetone, methyl ethyl ketone, diisobutylketone, propyleneglycol monomethyl ether, alkyl-alcohols, such as isopropanol, decanol, and t-butanol; and supercritical carbon dioxide.

The nonaqueous PNP dispersion is prepared by first charging a heel charge, containing solvent, or alternatively, a mixture of solvent and some portion of the monomers, to a reaction vessel. The monomer charge is typically composed of monomers, an initiator, and a chain transfer agent. Typically, initiation temperatures are in the range of from 55° C. to 125° C., although lower or higher initiator temperatures are possible when using suitable low temperature and high temperature initiators, respectively, as is known in the art. After the heel charge has reached a temperature sufficient to initiate polymerization, the monomer charge or balance of the monomer charge is added to the reaction vessel. The monomer charge time period is typically in the range of from 15 minutes to 4 hours, although both shorter and longer time periods are utilizable. During the monomer charge, the reaction temperature is typically kept constant, although it is also possible to vary the reaction temperature. After completing the monomer mixture addition, additional initiator in solvent is charged to the reaction and/or the reaction mixture is held for a time.

Control of PNP particle size and distribution is achieved by choice and control of one or more parameters such as solvent, initiator, total solids level, initiator level, type and amount of multi-functional monomer, type and amount of ionic monomer, type and amount of chain transfer agent, and reaction conditions.

Initiators useful in the free radical polymerization of the present invention include, for example, one or more of peroxyesters, alkylhydroperoxides, dialkylperoxides, azoinitiators, persulfates, redox initiators and the like. The amount of the free radical initiator used is typically from 0.05 to 10% by weight, based on the weight of total monomer. According to certain embodiments, chain transfer reagents are used to control the extent of polymerization of the PNPs useful in the present invention. Suitable chain transfer agents include, for example: alkyl mercaptans, such as dodecyl mercaptan; aromatic hydrocarbons with activated hydrogens, such as toluene; and alkyl halides, such as bromotrichloroethane.

In one method of preparing the aqueous polymeric composition of the present invention, at least a portion of the polymerized ionic monomer units of the PNPs is neutralized with at least one neutralizing agent to form an at least partially neutralized nonaqueous PNP dispersion. The polymerized ionic monomer units of the PNPs are neutralized in a variety of ways. When the polymerized ionic monomer units are acidic, the neutralizing agent is typically a base. Likewise, when the polymerized ionic monomer units are basic, the neutralizing agent is typically an acid. Suitable bases include inorganic and organic bases. Suitable inorganic bases include the full range of the hydroxide, carbonate, bicarbonate, and acetate bases of alkali or alkaline metals. Suitable organic bases include ammonia, primary/secondary/tertiary amines, diamines, and triamines. Preferred basic neutralizing agents include sodium hydroxide, and ammonium hydroxide. Suitable acids include carboxylic acids, such as acetic acid; dicarboxylic acids; (di)carboxylic/hydroxyl acids; aromatic acids, such as benzoic acid; and a variety of other acids, such as boric, carbonic, citric, iodic, nitrous, nitric, periodic, phosphoric, phosphorous, sulfuric, sulfurous, and hydrochloric acid. None of the foregoing categories of bases and acids are deemed to be limiting.

The amount of neutralizing agent required to neutralize the nonaqueous PNP dispersion is typically determined on a molar basis of neutralizing agent to polymerized ionic monomer units of the PNPs. Without being bound to a particular theory, the amount of polymerized ionic monomer units (i.e., level of charge) needed to stabilize the PNPs (i.e., maintain particle size during conversion from non-aqueous to aqueous medium) varies as PNP composition and properties are varied. It is believed that the PNP hydrophobicity, Tg, crosslinking level, and type of counter-ion from the neutralizing agent are important variables. For providing stable aqueous PNP dispersions (i.e., wherein flocculation of the PNPs is minimized), the polymerized ionic monomer units are preferably at least 20%, more preferably at least 50%, even more preferably at least 80%, and most preferably at least 90% neutralized.

Neutralizing the PNPs is alternatively carried out in a variety of ways. In one method, the nonaqueous PNP dispersion is added to a solution containing the neutralizing agent while stirring. Preferably, the neutralizing agent is added as an aqueous solution over time while stirring the nonaqueous PNP dispersion to provide an at least partially neutralized nonaqueous PNP dispersion.

In one method of preparing the aqueous polymeric composition containing dispersed PNPs, the at least partially neutralized nonaqueous PNP dispersion is combined with an aqueous medium. The aqueous medium optionally contains the neutralizing agent(s) for neutralizing the PNPs, in which case the nonaqueous PNP dispersion is capable of being simultaneously neutralized and combined with an aqueous medium. The aqueous medium optionally contains surfactants, which are capable of altering the stability of the PNPs, or of altering other properties of the resulting aqueous PNP dispersion, such as its surface tension.

The sequence of admixing the partially neutralized nonaqueous PNP dispersion and the aqueous medium is not critical. Various methods and equipment, which are suitable for mixing are described in *The Chemical Engineer's Handbook*, 5$^{th}$ *Edition*, Perry and Chilton, Eds., McGraw-Hill, Ch. 21, 1973. Typically, the aqueous medium is continuously stirred while adding the partially neutralized nonaqueous PNP dispersion to it in order to ensure that the solvent is intimately mixed with the aqueous medium, which minimizes flocculation of the PNPs.

Suitable weight percentages of the PNPs in the aqueous polymeric composition, based on total weight of the aqueous polymeric composition, are typically from 1 to 90 weight %, more typically from 2 to 75 weight %, even more typically from 4 to 65 weight %, further more typically from 8 to 55 weight %, and most typically from 10 to 45 weight %.

While the preparation of the aqueous polymeric composition of the present invention does not require the use of surfactants, and it is typical that the nonaqueous PNP dispersions are substantially free of surfactants, surfactants are included in certain embodiments. When present, the amount of surfactants is typically less than 3 weight percent, more typically less than 2 weight percent, even more typically less than 1 weight percent, further typically less than 0.5 weight percent, and even further typically less than 0.2 weight percent, based on total weight of the PNPs.

The aqueous polymeric composition is optionally treated to remove at least a portion of the solvent, and in certain embodiments, also water, to increase the solids content of the PNPs. Suitable methods to concentrate the PNPs include distillation processes, such as forming azeotropes of water and a suitable solvent; evaporation of solvent or water; drying the aqueous polymeric composition by freeze drying or spray drying; solvent extraction techniques; and ultrafiltration techniques. Preferably at least 25 weight %, more preferably at least 50 weight %, even more preferably at least 75 weight %, and most preferably 100 weight % of the solvent is exchanged with water. Removal of the solvent is preferably carried out under conditions that minimize destabilization (i.e., flocculation) of the PNPs.

In an alternative method, the aqueous polymeric composition of this invention is prepared by a method including the steps of preparing a nonaqueous PNP dispersion containing the PNPs dispersed in at least one solvent that is both a suitable solvent for the PNPs and is compatible or miscible in water; and combining the nonaqueous PNP dispersion with an aqueous medium. Examples of such suitable solvents for acrylic-containing PNPs, which are also compatible or miscible with water, include isopropanol and ether alcohols (e.g., monobutyl ether of ethylene glycol and monoethyl ether of diethylene glycol). In this method, the PNPs do not require the addition of neutralizing agents to impart particle stability when combined with water.

Alternative embodiments of the aqueous polymeric compositions of the present invention have a wide range of PNP content. Typically, the PNP weight fractions range from 0.1 to 99 weight %, more typically from 1 to 90 weight %, even more typically from 2 to 75 weight %, further typically from 5 to 50 weight %, and most typically from 10 to 40 weight %, based on the weight of the aqueous polymeric composition.

The PNPs are present in the aqueous polymeric composition at a level of from 0.1 to 100 weight % PNPs, based on the total weight of the polymer particles in the aqueous polymeric composition. The functional role of the PNPs determines the level of PNPs present. Some of the functional roles of the PNPs are, for example, as additives, as co-binders, as principal binders, and as sole binders. A lower level of PNPs is utilized when the PNPs function as additives and co-binders, while a higher level of PNPs is utilized when the PNPs function as principal binders or sole binders.

Certain embodiments of the aqueous polymeric compositions of the present invention further contain second particles that are not PNPs, and are second polymer particles, such as emulsion polymer particles, having a mean particle diameter of greater than 50 nm, or are pigment particles.

In one embodiment, the second polymer particles are prepared in the presence of the PNPs. In this embodiment, the PNPs are present in the aqueous polymeric composition at a level of from 1 to 99 weight %, preferably from 5 to 90 weight %, more preferably from 10 to 60 weight %, and most preferably from 20 to 60 weight %, based on the total weight of polymer in the aqueous polymeric composition.

The glass transition temperatures of the second polymer particles are typically in the range of from −60° C. to 120° C., depending upon the intended application of the aqueous polymeric composition containing the second polymer particles. Further, the second polymer particles typically have a mean diameter in the range of from greater than 50 nm up to 2 microns, preferably in the range of from 80 nm to 500 nm, and more preferably, in the range of from 100 nm to 350 nm. The second polymer particles are commonly supplied as aqueous dispersions.

Examples of second polymer particles include polymer particles prepared by emulsion polymerization and include crosslinked and uncrosslinked polymer particles, polymer particles containing two or more polymer phases such as core-shell polymer particles, and polymer particles having one or more voids and vesiculated polymer particles as disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422.

Specific examples of second polymer particles are acrylic copolymers, vinyl acetate copolymers, vinyl/acrylic copolymers, styrene/acrylic copolymers, polyurethanes, polyvinyl chlorides, ethylene/vinyl acetate copolymers, styrene/butadiene polymers, and mixtures thereof.

Alternatively, the second particles are pigment particles. As used herein, pigment particles include inorganic particles such as pigments, extenders, or fillers; and organic colored pigments. Examples of pigment particles include zinc oxide, antimony oxide, zirconium oxide, chromium oxide, iron oxide, lead oxide, zinc sulfide, lithopone, titanium dioxide including anatase and rutile titanium dioxide, calcium carbonate, calcium sulfate, barium sulfate, mica, clay including delaminated clay, calcined clay, feldspar, nepheline syenite, bismuth vanadate; titanium nickel antimony oxide, cobalt oxides, wollastonite, diatomaceous earth, alumina silicates, carbon black, aluminum oxide, silica, talc, and mixtures thereof. The mean diameter of the pigment particles is typically in the range of from 5 nm to greater than 100 microns, preferably in the range of from 20 nm to 20 microns, and more preferably, in the range of from 50 nm to 10 microns.

The aqueous polymeric composition containing PNPs according to the present invention is useful for treating porous materials including wood substrates. Wood substrates are characterized as having a surface containing pores as well as an internal porous structure. The PNPs enter into the wood pores and penetrate into the wood substrate. A method of treating the wood substrate includes the steps of applying the aqueous polymeric composition of this invention, which contains PNPs, onto a wood substrate; allowing the aqueous polymeric composition to penetrate or to be absorbed into the wood substrate; and drying or allowing to dry the applied aqueous polymeric composition. According to certain embodiments of the method, pressure is also applied to increase the penetration of the PNPs into the wood substrate. Treatment of the wood substrate with the aqueous polymeric composition provides increased protection against weathering caused by conditions such as exposure to moisture or sunlight. Treatment of the wood substrate with the aqueous polymeric composition also improves the aesthetic appearance of the wood substrate. Wood substrates which are capable of being so treated include timber such as, for example, cedar, pine, spruce, fir, redwood, hemlock, teak, oak, cherry, poplar, maple, and walnut; and processed timber, such as including, but not limited to, medium density fiber board, chip board, and laminates such as plywood.

According to certain embodiments, the aqueous polymeric composition useful for treating wood substrates is provided as a blend further containing second polymer particles. Without wishing to be limited to a particular theory, the larger second polymer particles are believed to remain at or near the surface of the wood substrate, and to provide protection to the wood substrate surface. Preferably, these second polymer particles have a mean particle diameter in the range of from greater than 50 nm to 500 nm; and they have a glass transition temperature in the range of from 0° C. to 50° C.

A volatile organic compound ("VOC") is defined herein as a carbon containing compound that has a boiling point below 280° C. at atmospheric pressure. Compounds such as water and ammonia are excluded from the definition of VOC. The VOC level of a composition is the total amount of one or more volatile organic compounds contained in the composition.

Frequently a VOC is deliberately added to a paint or a coating composition to improve film formation of the resulting coating or to aid in the application properties of the composition employed to prepare the coating. Examples of VOCs are glycol ethers, organic esters, aromatic compounds, ethylene and propylene glycols, and aliphatic hydrocarbons. Additionally, methods of paint or coating composition preparation frequently introduce adventitious VOCs from various ingredients such as the aqueous dispersion containing the PNPs, and from an optional component such as the aqueous dispersion containing second particles, biocides, soaps, dispersants, and thickeners. These typically account for less than 20 grams (g) VOC per liter of the aqueous polymeric composition. Steam stripping and choice of low VOC containing additives for those additives such as biocides, defoamers, soaps, dispersants, and thickeners, are some alternative methods commonly used to further reduce VOC content of the aqueous polymeric composition to less than 5 g VOC per liter of the aqueous polymeric composition.

Preferably, the aqueous polymeric composition of this invention is a low VOC composition having a VOC level of less than 150 grams per liter (g/liter) of the aqueous polymeric composition; more preferably the aqueous polymeric composition has a VOC level of less than 100 g/liter of the aqueous polymeric composition; and even more preferably the aqueous polymeric composition has a VOC level of less than 50 g/liter of the aqueous polymeric composition.

In certain embodiments, the aqueous polymeric composition contains hard PNPs having a glass transition temperature of at least 50° C. and soft second polymer particles having a glass transition temperature in the range of from −40° C. to 70° C. In dried coatings prepared from the aqueous polymeric composition of such embodiments, the hard PNPs provide one or more improved film properties, such as increased resistance to wear, improved block resistance, improved tint retention, increased elongation of the coating, improved impact resistance, improved adhesion, improved corrosion resistance, improved gloss retention and improved dirt pickup resistance, as compared to a comparative dried coating without the hard PNPs. In this embodiment, the ratio of the weight of the hard PNPs to the weight of the soft second polymer particles is in the range of from 1:99 to 1:1, preferably in the range of from 1:50 to 1:3, and most preferably in the range of from 1:20 to 1:4. Certain embodiments of the aqueous polymeric composition containing the hard PNPs and the soft second polymer particles are provided as a low VOC composition. Preferably, in such low VOC embodiments of the hard PNP-containing composition, the ratio of the weight of the PNPs to the weight of the second polymer particles is in the range of from 1:20 to 1:3 and more preferably in the range of from 1:9 to 1:5. Further, it is preferred that the hard PNPs have a glass transition temperature in the range of 50° C. to 100° C., and preferably in the range of from 60° C. to 80° C. A preferred range for the glass transition temperature of soft second polymer particle in the low VOC, hard PNP-containing compositions is from 0° C. to 15° C.

In certain embodiments, the aqueous polymeric composition contains PNPs having first reactive groups. In such embodiments, the first reactive groups are self reactive to form chemical bonds. An example of PNPs having self reactive groups is PNPs containing, as polymerized units, methylol acrylamide.

In certain other embodiments, the aqueous polymeric composition contains second polymer particles having second reactive groups. In this embodiment, the second reactive groups are self reactive to form chemical bonds. An example of second polymer particles having self reactive groups is second polymer particles containing, as polymerized units, methylol (meth)acrylamide.

In still certain other embodiments, the aqueous polymeric composition contains PNPs having first reactive groups and second polymer particles having second reactive groups, wherein the first reactive groups and the second reactive groups are co-reactive to form chemical bonds. In this embodiment, the aqueous polymeric composition is applied onto a substrate; dried or allowed to dry; and the first reactive groups and the second reactive groups are reacted or allowed to react to form a dried crosslinked coating. Examples of complementary pairs of first and second reactive groups include, for example, isocyanates and isothiocyanates, which react with reactive groups selected from alcohols, amines, ureas, anhydrides, and mixtures thereof; aldehyde groups, which react with reactive groups selected from acetoacetoxy groups, amine groups, and mixtures thereof; acetoacetoxy groups, which react with reactive groups selected from aldehyde groups, amine groups, and mixtures thereof; epoxides, thioranes, and aziridines, all three of which react with reactive groups selected from alcohol groups, carboxylic acid groups, anhydride groups, amine groups, mercaptan groups, and mixtures thereof; carbodiimides, which react with reactive groups selected from carboxylic acid groups, phosphorus acid groups, alcohol groups, amine groups, mercaptan groups, and mixtures thereof; haloalkane and halomethylphenyl groups, both of which react with reactive groups selected from amine groups, carboxylic acid groups, and mixtures thereof; amines and thiols, both of which react with reactive groups selected from epoxide groups, aziridine groups, thiorane groups, acetoacetoxy groups, isocyanate groups, isothiocyanate groups, carbodiimide groups, and mixtures thereof; and carboxylic acids, which react with reactive groups selected from epoxide groups, aziridine groups, thiorane groups, carbodiimide groups, and mixtures thereof. Alternatively, the first reactive groups and the second reactive groups are the same reactive functionality and are self reactive. Examples of suitable chemical bonds between the PNPs and the second polymer particles include the following types of linkages: esters, amides, ethers, urethanes, thiol ethers, amines, and ureidos. In certain embodiments, the reaction between the first reactive group and the second reactive group occurs during the drying step. Alternatively, in other embodiments, drying occurs any time prior to film formation, provided that the extent of reaction does not materially impair film formation. According to certain embodiments, the reaction of the first reactive group and the second reactive group is conducted in the presence of one or more catalysts. Alternatively, no catalyst is used. Techniques to determine the extent of reaction of the first reactive group and the second reactive group include infrared spectroscopy, nuclear magnetic resonance spectroscopy, and ultraviolet-visible spectroscopy.

One method to prepare the PNP containing the first reactive group is an addition polymerization process that includes polymerization of at least one monomer containing a select reactive group, wherein the select reactive group is the first reactive group. Examples of monomers containing a select reactive group include ionic monomers, and isocyanate monomers, such as isocyanato ethyl methacrylate, dimethyl meta-isopropenyl benzyl isocyanate; acetoacetoxy monomers, such as acetoacetoxy ethyl(meth)acrylate; aldehyde monomers, such as acrolein and methacrolein; amine monomers, such as t-butyl aminoethyl (meth)acrylate, dimethyl aminoethyl(meth)acrylate, aminobutyl(meth)acrylate, aminoethyl(meth)acrylate; aminopropyl(meth)acrylate; and oxazolidinoethyl (meth)acrylate; epoxy monomers, such as glycidyl(meth)acrylate; carboxylic acid monomers, such as (meth)acrylic acid, itaconic acid, fumaric acid, maleic acid, β-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid; hydroxy containing monomers, such as hydroxyalkyl (meth)acrylates including 2-hydroxyethyl (meth)acrylate and 3-hydroxypropyl (meth)acrylate; halogenated monomers, such as bromopropyl(meth)acrylate; and halomethyl-styrene. A suitable process to prepare the second polymer particles having at least one second reactive group is addition polymerization of at least one monomer having a select reactive group, wherein the select reactive group is the second reactive group. Alternatively, either the first reactive group or the second reactive group is generated by functionalization of a precursor group after polymerization of the PNPs or the second polymer particle, respectively. Second polymer particles suitable for use in the present embodiment include particles having a single polymer phase and particles having two or more polymer phases, such as core-shell particles, acorn particles having an outer polymer phase partially encapsulating a core polymer phase, and particles having one polymer phase forming multiple domains on or within a second polymer phase.

In yet other embodiments, the aqueous polymeric composition contains PNPs having first reactive groups and second polymer particles having second reactive groups, wherein the PNPs have a lower glass transition temperature than the second polymer particles. While not wanting to be bound by a particular theory, it is believed that the low $T_g$ PNPs aid in the film formation of the second polymer particles and allow the aqueous polymeric composition to form a film with a lower amount of coalescent than a film formed from the second polymer particles in the absence of the PNPs. After film formation, the first and second reactive groups react to form crosslinks to provide the film with improved properties than a film absent the crosslinks. Preferably, the PNPs have a $T_g$ in the range of from −10° C. to 15° C., and more preferably in the range of from 0° C. to 5° C. Preferably, the second polymer particles having second reactive groups have a $T_g$ in the range of from 5° C. to 35° C., and more preferably in the range of from 15° C. to 25° C. The ratio of the weight of PNPs having first reactive group to the weight of second polymer particles having second reactive groups is in the range of from 1:100 to 1:3, preferably in the range of from 1:25 to 1:4; and more preferably, in the range of from 1:20 to 1:5. Certain embodiments of such aqueous polymeric compositions containing PNPs having first reactive groups and second polymer particles having second reactive groups, wherein the PNPs have a lower glass transition temperature than the second polymer particles, are provided as low VOC compositions.

In yet still other certain embodiments of the present invention, the aqueous polymeric composition contains a ternary mixture of polymer particles having select particle sizes. The ternary mixture includes: a small mode of PNPs having a mean particle diameter in the range of from 10 nm to 20 nm; a medium mode of polymer particles having a mean particle diameter in the range of from 30 nm to 70 nm; and a large mode of second polymer particles having a mean particle diameter in the range of from 100 nm to 200 nm. Suitable medium mode polymer particles are PNPs having a mean diameter in the range of from 30 nm to 50 nm, second polymer particles having a mean diameter in the range of greater than 50 nm to 70 nm, and mixtures thereof. Preferably, the ternary mixture has a small mode of PNPs with a $T_g$ in the range of from −10° C. to 5° C., and more preferably in the range of from −5° C. to 0° C. Preferably the ternary mixture has a medium mode of PNPs with a $T_g$ in the range of from 0° C. to 15° C., and more preferably in the range of from 5° C. to 12° C. Preferably the ternary mixture has a large mode of second polymer particles with a $T_g$ in the range of from 5° C. to 20° C., and more preferably in the range of from 10° C. to 15° C. The aqueous polymeric composition containing the ternary mixture of polymer particles is useful for preparing coatings having a balance of good film formation and acceptable film properties such as hardness, dirt pickup resistance, scrub resistance, block resistance, or gloss. Certain embodiments of aqueous polymeric compositions contains a ternary mixture of polymer particles having select particle sizes are provided as a low VOC composition.

The total amount of pigment and second polymer particles having a $T_g$ of at least 50° C. in the aqueous polymeric composition is defined according to the volume concentration of these components in the dried coating formed from the aqueous polymeric composition or equivalently, by the volume concentration of these components based on the total volume of solids in the aqueous polymeric composition. The percent total volume concentration of the pigment and second polymer particles having a $T_g$ of at least 50° C., referred to herein as the "pigment volume concentration" or "PVC" is calculated by the following formula:

PVC(%)=100×[$V_1$+$V_2$]/$V_T$ wherein $V_1$ is the volume of the pigment(s), $V_2$ is the volume of second polymer particles with a $T_g$ of at least 50° C., and $V_T$ is the volume solids of the aqueous polymeric composition. The aqueous polymeric composition of this invention includes compositions having pigment volume concentrations in the range of from 0 to 95% and thereby encompasses coating compositions sometimes described in the art as clear coatings, stains, flat coatings, satin coatings, semi-gloss coatings, gloss coatings, primers, textured coatings, paper coatings, and the like.

One method to prepare the aqueous polymeric composition of this invention, which contains pigment particles, is by admixing the aqueous polymeric composition containing the PNPs and an aqueous slurry containing dispersed pigment particles. Mixing is typically employed to minimize localized concentrations of either the PNPs or the pigment particles. Alternatively, the pigmented aqueous polymeric composition of this invention is prepared by admixing dry pigment particles into the aqueous polymeric composition containing PNPs to disperse the pigment particles into the aqueous medium. Typically, high shear mixing is employed to disperse the dried pigment particles. In certain embodiments, dispersants are added to aid in dispersing or stabilizing the pigment particles in the aqueous medium of the aqueous polymeric composition.

In certain other embodiments, the aqueous polymeric composition of this invention further contains one of pigment particles, second polymer particles having a $T_g$ of at least 50° C., and mixtures thereof. This aqueous polymeric composition has a PVC of at least 70%, preferably of at least 75%, and more preferably at least 80%. The aqueous polymeric composition of this embodiment is useful as a coating composition suitable for preparing opaque dried coatings, such as a dried flat paint or a dried paper coating. The PNPs contained in this aqueous polymeric composition have a $T_g$ in the range of from −20° C. to 40° C., preferably in the range of from −10° C. to 30° C., and more preferably in the range of from −5° C. to 25° C. The aqueous polymeric composition of this embodiment, which is suitable as a paint or a paper coating composition, typically contains one or more of titanium dioxide, calcium carbonate, and clay, as the pigment particle. Certain other embodiments also still further contain solid bead polymer particles or polymer particles having one or more voids, as the second polymer particles, with a $T_g$ of at least 50° C.

In yet still certain other embodiments, the aqueous polymeric composition contains PNPs and second polymer particles, wherein the second polymer particles are prepared in the presence of the PNPs. In this embodiment, the PNPs are present in the aqueous polymeric composition at a level of from 1 to 99 weight %, preferably from 5 to 90 weight %, more preferably from 10 to 60 weight %, and most preferably from 20 to 60 weight %, based on the total weight of polymer in the aqueous polymeric composition. Preferably, the second polymer particles are polymerized by aqueous emulsion polymerization. In this process, the PNPs are added to an aqueous reaction medium prior to or during the polymerization of the second polymer particles. The PNPs of the present embodiment are believed to act as stabilizers (i.e., dispersants) in the aqueous emulsion polymerization process, such as according to methods which use "high acid" polymeric stabilizers (often referred to as "resin supported emulsion polymerization", see for example U.S. Pat. No. 4,845,149 and U.S. Pat. No. 6,020,061). Among suitable emulsion polymer compositions, any emulsion polymer, copolymer, multi-stage copolymer, interpolymer, core-shell polymer, and the like can be stabilized using the PNPs of the present invention. Preferred second polymer particles include, as polymerized units, at least one (meth)acrylic ester monomer.

According to certain embodiments, the emulsion polymerization process performed in the presence of the PNPs, further includes synthesis adjuvants, such as surfactants, initiators, and buffers. The resulting aqueous polymeric composition prepared by this process contains PNPs on the second polymer particle surface as well as PNPs dispersed in the aqueous phase. The aqueous polymeric composition of this embodiment is useful for preparing coatings having improved properties, such as, gloss. Also, the aqueous polymeric composition containing such PNP stabilized second polymer particles, displays enhanced colloidal stability relative to analogous blends of PNPs and second polymer particles that are prepared in the absence of PNPs.

One aspect of the present invention is directed towards a method of preparing a coating from the aqueous polymeric composition containing the PNPs. The method includes the steps of applying the aqueous polymeric composition onto a substrate; and drying or allowing to dry the applied aqueous polymeric composition to provide the coating. The aqueous polymeric composition is typically applied onto a substrate to prepare a dry coating. Suitable techniques for applying the aqueous polymeric composition onto a substrate include brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the applied aqueous polymeric composition is commonly in the range of 1 micron to 5 millimeters. The aqueous polymeric composition is applied onto a substrate as a single coat and alternatively multiple coats. The applied aqueous polymeric composition is typically allowed to dry at ambient conditions and alternatively dried by the application of heat to provide a dry coating. Drying is typically allowed to proceed under ambient conditions such as, for example, at 0° C. to 35° C. The method is useful for providing coatings that have at least one improved property compared to a comparative coating prepared in the absence of the PNPs. Examples of improved properties include block resistance, print resistance, mar resistance, scrub resistance, abrasion resistance, burnish resistance, dirt pickup resistance, adhesion, gloss, flexibility, toughness, impact resistance, reduced coalescent demand, water resistance, chemical resistance, biological fouling resistance, and stain resistance.

In a pigmented coating, pigment particles are dispersed within a polymeric film to provide opacity or hiding. The opacity of the pigmented coating arises from the scattering of light, which results from differences in the refractive indices of the polymeric film and the pigment particles contained within. The pigment particles typically have a refractive index of 1.8 or greater. Refractive indices for polymers are typically in the range of 1.4 to 1.6. In one embodiment, the improved coating is a pigmented coating that is prepared from an aqueous polymeric composition containing PNPs, second polymer particles, and pigment particles. The improved pigmented coating has a polymeric film that is formed from the second polymer particles and the PNPs. The polymeric film of the improved pigmented coating has a lower refractive index than a film formed absent the PNPs and thus has a greater difference in the refractive indices of the polymeric film and the pigment contained within. The improved pigmented coating provides increased hiding compared to a pigmented coating absent the PNPs. The polymer film of the improved pigmented coating typically contains from 2 to 30 weight % PNPs, based on the total weight of the polymeric film.

Yet still other certain embodiments of the aqueous polymeric composition include one or more other components, such as, without limitation, other polymers, surfactants, other pigments, other extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, and antioxidants.

The following examples are presented to illustrate the composition and the process of the invention. These examples are intended to aid those skilled in the art in understanding the present invention. The present invention is, however, in no way limited thereby.

EXAMPLE 1

Aqueous Polymeric Composition Containing PNPs and Second Polymer Particles

An aqueous polymeric composition is prepared by admixing an aqueous dispersion containing PNPs with an aqueous dispersion containing second polymer particles. The PNPs contain, as polymerized units, 60 weight % methyl methacrylate, 30 weight % acrylic acid, and 10 weight % trimethylolpropane triacrylate. The PNPs have a $T_g$ above 50° C. and a mean particle diameter of 12 nm. The aqueous dispersion containing the PNPs is provided at pH=8 with ammonia. The second polymer particles are acrylic copolymer particles having a $T_g$ of 3° C. and a mean particle diameter of 155 nm. The aqueous polymeric composition, Example 1.1, contains 15 weight % PNPs and 85 weight % second polymer particles, and has a total polymer solids content of 33 weight %.

A pigmented aqueous polymeric composition and a comparative composition are prepared by combining the ingredients in Table 2.1 in the order listed.

| Ingredient | Example 1.2 | Comparative A |
|---|---|---|
| titanium dioxide dispersion (77 weight %) | 344.07 g | 344.07 g |
| Water | 20.00 g | 20.00 g |
| propylene glycol | 16.50 g | 16.50 g |
| Example 1.1 (33 weight % solids) | 537.65 g | — |
| Aqueous dispersion of second polymer particles (33 weight % solids) | — | 537.65 g |
| surfactant | 1.00 g | 1.00 g |
| ammonia (28%) | 0.70 g | 0.70 g |
| Acrysol ™ RM-2020 NPR rheology modifier (Rohm and Haas Co.) | 29.00 g | 29.00 g |
| Acrysol ™ RM-8W rheology modifier (Rohm and Haas Co.) | 5.60 g | 5.60 g |
| Water | 104.2 g | 113.62 g |
| VOC (weight %) | <2.25 | <2.25 |

Dry coating samples are prepared from the pigmented aqueous polymeric composition, Example 1.2, and the comparative composition, Comparative A, and are evaluated according to the procedure for the scrub resistance test. The two compositions are applied in such a way that the two compositions are placed side by side and drawn together by a single drawing with a 0.0762 mm (3 mil) film applicator 152.4 mm (6 inch) in width. Each composition forms a 7.5 cm (3 inch) wide coating on a single vinyl chart, and the two compositions have the same coating thickness. The samples are allowed to dry at 23° C. and 50% relative humidity for 7 days. Abrasive scrub resistance is measured with a scrub machine using 10 g scrub medium and 5 ml water. A piece of 0.0254 mm (1 mil) thick and 76.2 mm wide vinyl shim is placed underneath the sample vinyl chart. The two side edges of the shim are in the center of each coating. The number of cycles required to completely cut through each coating is recorded.

The coating prepared from the pigmented aqueous polymeric composition of Example 1.2 requires 750 cycles to cut through the coating. In contrast, the coating prepared from the pigment comparative composition of Comparative A requires 360 cycles to cut through the coating. The results show that the aqueous polymeric composition of this invention is useful for preparing coatings with improved scrub resistance.

EXAMPLE 2

Preparation of PNPs

EXAMPLE 2.1

PNPs are prepared containing, as polymerized units, 35 weight % methyl methacrylate, 35 weight % butyl acrylate, 20 weight % acrylic acid, and 10 weight % trimethylolpropane triacrylate. The PNPs are prepared according to the following process: A 5-liter reactor is fitted with a thermocouple, a temperature controller, a purge gas inlet, a water-cooled reflux condenser with purge gas outlet, a stirrer, and a monomer feed line. To a first additional vessel, 450.0 g of a monomer mixture (A) is prepared by admixing 157.5 g methyl methacrylate, 157.5 g butyl acrylate, 90.0 g acrylic acid, and 45.0 g trimethylolpropane triacrylate. To a second additional vessel, an initiator mix (B) is prepared by admixing 18.00 g of a 75% solution of t-amyl peroxypivalate in mineral spirits and 112.50 g isopropyl alcohol. A charge of 2325 g isopropyl alcohol is added to the reactor. Nitrogen gas is flowed through the reactor for approximately 30 minutes. Next, the contents of the reactor are heated to 79° C. while maintaining the flow of nitrogen gas. Next, a dual feed of the monomer mixture (A) and the initiator mix (B) are added to the reactor. The two mixtures are feed uniformly using feed pumps over an addition period of 120 minutes. At the end of the monomer and initiator feeds, the contents of the reactor are maintained at 79° C. for 30 minutes. Next, the first of three additional initiator charges, each containing 9.00 g of a 75% solution of t-amyl peroxypivalate in mineral spirits, and 22.50 g isopropyl alcohol, is added. A second initiator charge is added 30 minutes after the first initiator charge addition. Similarly, the final initiator charge is added 30 minutes after the second initiator charge addition. The contents of the reactor are then held at a temperature of 79° C. for a period of 150 minutes. Next, contents of the reactor are neutralized with a mixture of 42.5 g of aqueous ammonia (28% active) and 450.0 g water. Solvent is removed from the contents of the reactor by using a roto-evaporator at 35° C. and at reduced pressure. Next, water is added to dilute the concentration of the resulting PNPs to 25.6 weight %. The resulting aqueous polymeric composition, Example 2.1, contains PNPs with a mean particle diameter of 5 nm and has a pH of 8.5.

EXAMPLE 2.2

PNPs containing, as polymerized units, 35 weight % methyl methacrylate, 35 weight % butyl acrylate, 20 weight % acrylic acid, and 10 weight % trimethylolpropane triacrylate are prepared according to the general procedure for preparing Example 2.1. The resulting aqueous polymeric composition contains PNPs having a mean particle diameter of 5 nm and has a solids level of 25 weight %.

EXAMPLE 3

Preparation of Second Polymer Particles in the Presence of PNPs

Second polymer particles are prepared by emulsion polymerization in the presence of PNPs. The reaction vessel is a 2-liter, 4 neck round bottom flask equipped with a side arm, condenser, stirrer, and thermocouple.

EXAMPLE 3.1

To the flask, 342 g of the aqueous polymeric composition of Example 2.1 is added. The contents of the flask is heated to 85° C. under a nitrogen atmosphere. Next, a monomer mixture containing 175.0 g butyl acrylate and 175.0 g methyl methacrylate is added over a 1.5 hour period, while coadding a separate solution of 2.63 g ammonium persulfate in 100.0 g deionized water and 0.22 g of 28% ammonium hydroxide over a 2 hour time period. After the addition of the monomer mixture is complete, the persulfate containing cofeed is continued for 30 minutes. Next, the contents of the flask is maintained at a temperature of 85° C. for 60 minutes. The contents of the flask is allowed to cool to 25° C. and is filtered through a $^{100}/_{325}$ mesh set of stacked screens, yielding a negligible quantity of coagulated polymer. The resulting filtered emulsion polymerization product, an aqueous polymeric composition containing PNPs and second polymer particles, has a total polymer solids content of 55.04%, a pH of 7.5, second polymer particles with a mean diameter of 128 nm, and a viscosity of 1.09 pascal second. The aqueous polymeric composition of Example 3.1 contains 20 weight % PNP and 80 weight % second polymer particles, based on the total weight of polymer.

EXAMPLE 3.2

Second polymer particles are prepared in the presence of PNPs according to the general procedure for Example 3.1. The resulting aqueous polymeric composition of Example 3.2 contains 50 weight % PNPs of Example 3.1 and 50 weight % second polymer particles containing, as polymerized units, 65 weight % butyl acrylate and 35 weight % methacrylic acid, based on the total weight of polymer.

What is claimed is:

1. An aqueous polymeric composition comprising:
    (a) polymeric nanoparticles, dispersed in an aqueous medium, said polymeric nanoparticles comprising, as polymerized units:
        i) at least one multiethylenically unsaturated monomer, and
        ii) at least one water soluble monomer,
    said nanoparticles having a mean diameter in the range of from 1 to 10 nanometers and a glass transition temperature of at least 50° C.; and
    (b) second particles dispersed in said aqueous medium, said second particles being selected from the group consisting of second polymer particles and mixtures of second polymer particles and pigment particles, said second polymer particles having a glass transition temperature in the range of from −40° C. to 70° C.;

wherein a total volume concentration of said pigment particles and said second polymer particles is at least 70%, based on total solids volume of said aqueous polymeric composition.

2. The aqueous polymeric composition according to claim 1 wherein:

said polymeric nanoparticles have a first reactive group; and said second polymer particles have a second reactive group capable of reacting with said first reactive group of said polymeric nanoparticles.

3. The aqueous polymeric composition according to claim 1 wherein said aqueous polymeric composition has a volatile organic compound level of less than 150 grams per liter of said aqueous polymeric composition.

* * * * *